United States Patent
Chen et al.

(10) Patent No.: US 10,061,681 B2
(45) Date of Patent: *Aug. 28, 2018

(54) SYSTEM FOR DISCOVERING BUGS USING INTERVAL ALGEBRA QUERY LANGUAGE

(71) Applicant: EMC IP Holding Company LLC, Hopkinton, MA (US)

(72) Inventors: Kai Chen, Shanghai (CN); Jun Tao, Shanghai (CN); Ping Chen, Shanghai (CN); Michael John Dutch, Saratoga, CA (US); Mark Chamness, Menlo Park, CA (US); William Dale Andruss, Minneapolis, MN (US); Bo Chen, Shanghai (CN); Christopher Hercules Claudatos, San Jose, CA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 169 days.

This patent is subject to a terminal disclaimer.

(21) Appl. No.: 14/746,510

(22) Filed: Jun. 22, 2015

(65) Prior Publication Data

US 2016/0041892 A1    Feb. 11, 2016

Related U.S. Application Data

(63) Continuation of application No. 14/040,397, filed on Sep. 27, 2013, now Pat. No. 9,092,563.

(51) Int. Cl.
   *G06F 9/44*    (2018.01)
   *G06F 11/36*   (2006.01)
   *G06F 11/07*   (2006.01)

(52) U.S. Cl.
   CPC ........ *G06F 11/362* (2013.01); *G06F 11/0706* (2013.01); *G06F 11/0751* (2013.01); *G06F 11/366* (2013.01)

(58) Field of Classification Search
   CPC ...................................... G06F 11/362
   USPC ........................................... 717/124
   See application file for complete search history.

(56) References Cited

U.S. PATENT DOCUMENTS

| | | | | |
|---|---|---|---|---|
| 7,493,347 B2* | 2/2009 | Smith | ............... | G06F 17/30386 |
| 7,698,603 B2* | 4/2010 | Staneff | ............... | G06F 11/3672 |
| | | | | 714/45 |
| 7,836,346 B1* | 11/2010 | Davidov | ............. | G06F 11/3692 |
| | | | | 714/38.1 |
| 7,934,125 B2* | 4/2011 | Harvey, Jr. | ........ | G05B 23/0281 |
| | | | | 714/25 |
| 8,335,582 B2* | 12/2012 | Shimshi | ............. | G05B 19/0428 |
| | | | | 700/108 |
| 8,359,581 B2* | 1/2013 | Ortiz | ................... | G06F 11/3688 |
| | | | | 714/25 |
| 8,620,928 B1* | 12/2013 | Walton | ................ | G06F 17/3053 |
| | | | | 707/748 |
| 8,694,831 B2* | 4/2014 | Arapov | ................ | G06F 11/366 |
| | | | | 714/38.1 |

(Continued)

*Primary Examiner* — Francisco Aponte
(74) *Attorney, Agent, or Firm* — Womble Bond Dickinson (US) LLP

(57) ABSTRACT

A system for discovering bugs comprises an input interface and a processor. The input interface is configured to receive a bug definition. The bug definition includes a set operator with a time constraint and one or more set operands. The input interface is configured to receive an event log. The processor is configured to determine a list of bug occurrences using the bug definition and the event log.

13 Claims, 5 Drawing Sheets

(56) References Cited

U.S. PATENT DOCUMENTS

| | | | | |
|---|---|---|---|---|
| 8,782,609 B2* | 7/2014 | Robinson | ............ | G06F 11/366 |
| | | | | 717/127 |
| 8,930,761 B2* | 1/2015 | Masser | ............... | G06F 11/3692 |
| | | | | 714/37 |
| 9,477,581 B2* | 10/2016 | Hudgons | ............. | G06F 11/3684 |
| 9,535,818 B2* | 1/2017 | Vasudevan | .......... | G06F 11/3664 |
| 9,665,826 B2* | 5/2017 | Jain | ........................ | G06N 5/022 |
| 2004/0254919 A1* | 12/2004 | Giuseppini | ....... | G06F 17/30964 |
| 2005/0120273 A1* | 6/2005 | Hudson | ............... | G06F 11/0748 |
| | | | | 714/38.11 |
| 2006/0168569 A1* | 7/2006 | Smith | ................. | G06F 11/3672 |
| | | | | 717/124 |
| 2007/0006037 A1* | 1/2007 | Sargusingh | ......... | G06F 11/3692 |
| | | | | 714/38.11 |
| 2008/0155342 A1* | 6/2008 | O'Callahan | ......... | G06F 11/3636 |
| | | | | 714/38.14 |
| 2008/0288446 A1* | 11/2008 | Hu | .................... | G06F 17/30536 |
| 2011/0219360 A1* | 9/2011 | Srinivasa | ................ | G06F 17/30 |
| | | | | 717/124 |
| 2013/0282739 A1* | 10/2013 | Anderson | ........... | G06F 17/2705 |
| | | | | 707/755 |
| 2015/0006519 A1* | 1/2015 | Jain | .................... | G06F 11/3636 |
| | | | | 707/723 |

* cited by examiner

| Operation | Symbol | Example | Description |
|---|---|---|---|
| BEFORE | < | X < Y | xxx yyy<br>X and Y both occur. End point of X is ahead of start point of Y. |
| AFTER | > | X > Y | yyy xxx<br>X and Y both occur. Start point of X is behind end point of Y. |
| EQUALS | = | X = Y | xxx<br>yyy<br>X and Y both occur. Duration of X and Y are totally overlapped. |
| MEETS | M | X M Y | xxxyyy or yyyxxx<br>X and Y both occur "End point of X equals start point of Y".<br>or "End point of Y equals start point of X" |
| OVERLAPS | O | X O Y | xxxx<br>  yyyy<br>X and Y both occur. Duration of X and duration of Y have overlap. |
| DURING | D | X D Y |  xxx<br>yyyyyyy<br>X and Y both occur. Start of X is after start of Y and end of X is before end of Y. |
| STARTS | S | X S Y | xxx<br>yyyyyy<br>X and Y both occur X and Y start at same time. |
| FINISHES | F | X F Y |   xxxx<br>yyyyyy<br>X and Y both occur X and Y finish at same time. |
| AND | & | X & Y | X and Y both occur. |
| OR | \| | X \| Y | Either X or Y occurs. |
| XOR | ⊕ | X⊕Y | Either X or Y occurs. But X and Y cannot both happen. |
| NOT | ! | ! X | No X occurs |
| TIMES | x[min, max] | Xx[3,5] | X occurs at least 3 times and at most 5 times |

FIG. 4

| Operation | Time Constraints | Example | Description |
|---|---|---|---|
| BEFORE | [<,≤] ts | X < [<1h] Y | End point of X is ahead of start point of Y in less than 1 hour |
| | = ts | X < [=1h] Y | End point of X is 1 hour ahead of start point of Y |
| | [>,≥] ts | X < [>1h] Y | End point of X is ahead of start point of Y more than 1 hour |
| AFTER | [<,≤] ts | X > [<1h] Y | Start point of X is behind end point of Y in less than 1 hour |
| | - ts | X > [=1h] Y | Start point of X is 1 hour behind end point of Y |
| | [>,≥] ts | X > [>1h] Y | Start point of X is behind start point of Y more than 1 hour |
| OVERLAPS | [<,≤] ts | X O [<1h] Y | Duration of X and Y have overlap and the overlap is less than 1 hour |
| | = ts | X O [=1h] Y | Duration of X and Y have overlap and the overlap is equal to 1 hour |
| | [>,≥] ts | X O [>1h] Y | Duration of X and Y have overlap and the overlap is more than 1 hour |
| STARTS | [<,≤] ts | X S [<1h] Y | X starts in less than 1 hour after Y's start |
| | = ts | X S [=1h] Y | X starts 1 hour later than Y's start |
| | [>,≥] ts | X S [>1h] Y | X starts later than Y's start and interval period is more than 1 hour |
| FINISHES | [<,≤] ts | X F [<1h] Y | X finishes in 1 hour after Y's finish |
| | = ts | X F [=1h] Y | X finishes 1 hour later than Y's finish |
| | [>,≥] ts | X F [>1h] Y | X finishes later than Y's finish and interval period is more than 1 hour |
| AND | [<,≤] ts | X & [≤1h] Y | X and Y both occur in a time window of 1 hour |
| XOR | [<,≤] ts | X ⊕ [≤1h] Y | Either X or Y occurs in 1 hour period. But X and Y cannot all occur |
| TIMES | [<,≤] ts | X x [≤1h] [3,5] | X occurs at least 3 times and at most 5 times in 1 hour |

FIG. 5

SYSTEM FOR DISCOVERING BUGS USING INTERVAL ALGEBRA QUERY LANGUAGE

CROSS REFERENCE TO OTHER APPLICATIONS

This application is a continuation of U.S. patent application Ser. No. 14/040,397, entitled SYSTEM FOR DISCOVERING BUGS USING INTERVAL ALGEBRA QUERY LANGUAGE filed Sep. 27, 2013 which is incorporated herein by reference for all purposes.

BACKGROUND OF THE INVENTION

Typically, when technical support personnel receive bug reports from customers, they analyze logs manually to find bugs. They often maintain a bug database or knowledge base that describes the symptoms of each bug. For example, the bug entitled, "File System Outage after Drive Failure" in the bug database would be described as: Having more than two occurrences of "Input/Output channel reset" within one hour after the occurrence of the message, "Device identifier not available" reported in the log file. Technical support personnel manually search logs for matches of the bug symptoms described within the bug database. Although such a bug discovery process is effective, the process is highly labor-intensive and therefore, inefficient and prone to human error.

BRIEF DESCRIPTION OF THE DRAWINGS

Various embodiments of the invention are disclosed in the following detailed description and the accompanying drawings.

FIG. 4 is a table illustrating an embodiment of operators.

FIG. 5 is a table illustrating an embodiment of operators.

DETAILED DESCRIPTION

Figure 1:
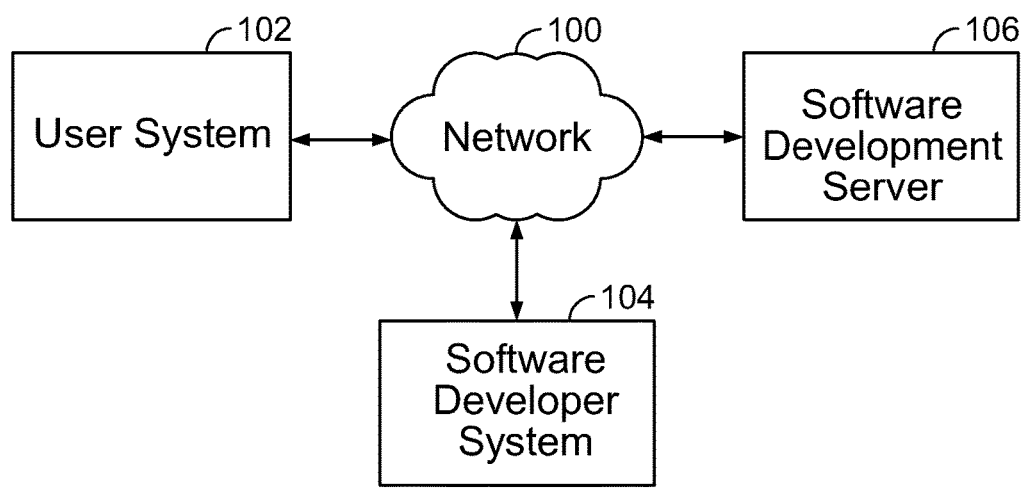
FIG. 1 is a block diagram illustrating an embodiment of a system for discovering bugs.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for discovering bugs using an interval algebra query language is disclosed. A system for discovering bugs comprises an input interface configured to receive a bug definition, wherein the bug definition includes a set operator with a time constraint and one or more set operands, and to receive an event log. The system for discovering bugs additionally comprises a processor configured to determine a list of bug occurrences using the bug definition and the event log. The system for discovering bugs additionally comprises a memory coupled to the processor and configured to provide the processor with instructions.

A system for discovering bugs receives and processes an event log (e.g., generated in response to a software error) in order to determine the software bug that caused the error. Rather than reading the log manually and searching for patterns that indicate a particular bug, the system for discovering bugs processes the event log to put it in a structured format, for instance a searchable database (e.g., an SQL database). The structured event log is then processed by a bug identifier module to identify the bug that caused the error. The bug identifier module is configured with one or more bug definitions that are processed into query commands for the structured event log. Bug definitions comprise set operators that process set operands.

FIG. 1 is a block diagram illustrating an embodiment of a system for discovering bugs. In the example shown, user system 102 runs software developed by a developer (e.g., using software developer system 104). When the system runs, it generates an event log. The event log is sent to software development server 106 via network 100. Software development server 106 processes the event log to identify bugs. The bugs or list of bugs can be communicated to user system 102 or software developer system 104 for correction, if appropriate.

In various embodiments, network 100 comprises one or more of the following: a local area network, a wide area network, a wired network, a wireless network, the Internet, an intranet, a storage area network, or any other appropriate communication network. In the example shown, user system 102 comprises a user system (e.g., a computing system for operation by a user). In various embodiments, there are 1, 6, 22, 122, 1059, or any other appropriate number of user systems communicating with network 100. In some embodiments, user system 102 comprises a system accessed by a user directly (e.g., the user is in proximity with user system 102). In some embodiments, user system 102 comprises a system accessed by a user remotely (e.g., the user is not in proximity with user system 102, and accesses user system 102 via network 100 and a separate user system). A user interacts with software running on user system 102. In some embodiments, the software was developed by a software developer (e.g., a software developer using software developer system 104). In various embodiments, software development server 106 comprises software developed by a software developer, software development tools, communications from a software user, a system for discovering bugs, or any other appropriate software. In some embodiments, software running on user system 102 contains bugs. In some embodiments, in the event that software running on user system 102 fails (e.g., crashes, etc.) the software produces an event log that can be delivered to software development server 106. A system for discovering bugs analyzes the event log to determine the bug that was the cause of the software failure.

Figure 2:
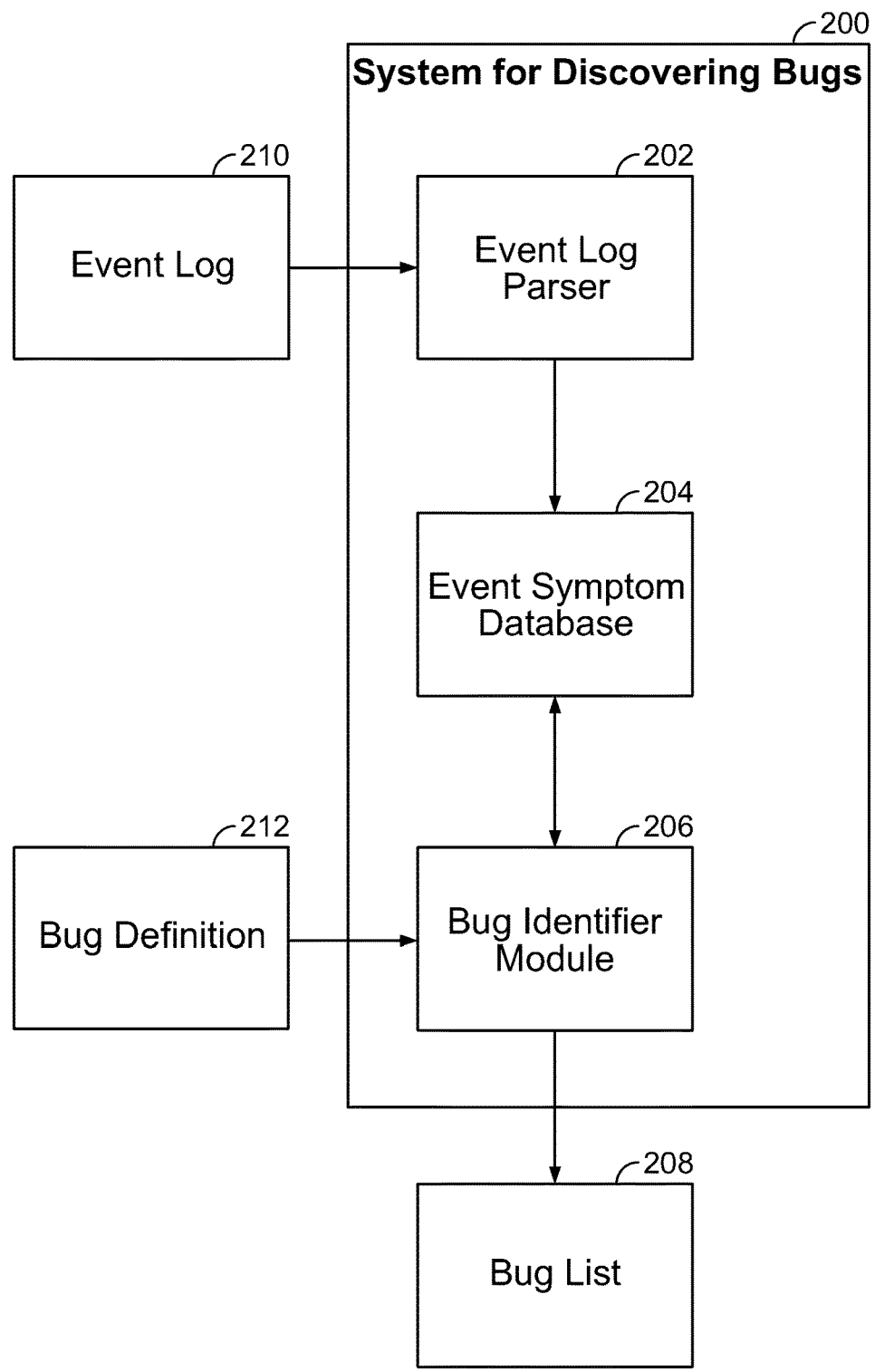
FIG. 2 is a block diagram illustrating an embodiment of a system for discovering bugs.

FIG. 2 is a block diagram illustrating an embodiment of a system for discovering bugs. In some embodiments, system for discovering bugs 200 runs on a software development server (e.g., software development server 106 of FIG. 1). In the example shown, system for discovering bugs 200 receives event log 210 (e.g., from a software user of software user system) and bug definition 212 (e.g., from a software developer of software developer system). In some embodiments, the event log comprises an event log produced by a software program in response to a failure. In some embodiments, the event log includes system status (e.g., CPU usage, CPU temperature, etc.). Event log parser 202 receives the event log and parses it to produce event symptom database 204. In some embodiments, the received event log (e.g., event log 210) comprises a text file of software status messages. In some embodiments, event symptom database 204 comprises a structured database (e.g., an SQL database) of software status messages. In various embodiments, event symptom database 204 comprises columns for one or more of the following: symptom type, symptom status, symptom variables, symptom time, or any other appropriate event symptom information. Bug identifier module 206 receives bug definition 212. In some embodiments, bug definition 212 comprises a set of rules for identifying bugs. In some embodiments, the rules for identifying bugs comprise event symptom conditions (e.g., conditions of event symptoms stored in event symptom database 204). For example, a bug definition could describe a first event symptom (e.g., system activity over 80%) occurring and lasting for at least 30 seconds, then stopping and followed no more than 1 second later by a second event condition (e.g., hard drive accesses overload). In some embodiments, a bug definition comprises a set operator (e.g., an operator such as BEFORE, AFTER, EQUALS, OVERLAPS) operating on one or more sets (e.g., sets of occurrences of event symptom conditions). For instance, the set operator OVERLAPS receives two sets as input. Each set is a set of rows, e.g., from event symptom database 204, describing occurrences of an event condition. In some embodiments, the output of a set operator is always a set. In some embodiments, set operators are always composable (e.g., any set operator can take the output of any other set operator as one of its inputs). In some embodiments, a set operator comprises a chain of set operators (e.g., multiple composed set operators). The set operator OVERLAPS outputs a set of occurrences of the condition that the two conditions overlap (e.g. the set includes an indication of true anywhere the two conditions occur at the same time and false anywhere else). In some embodiments, the set operator includes a time constraint (e.g., two conditions are only considered to overlap if they are determined to overlap for at least 0.5 seconds). Bug identifier module 206 loads the bug definitions from bug definition 212 and searches event symptom database 204 automatically to find the event symptom patterns described in the bug definition. Instances in event symptom database 204 of the patterns described in bug definition 212 are identified by bug identifier module 206 and output as part of bug list 208. In some embodiments, a software developer receives bug list 208 and attempts to fix the bug or bugs identified.

Figure 3:
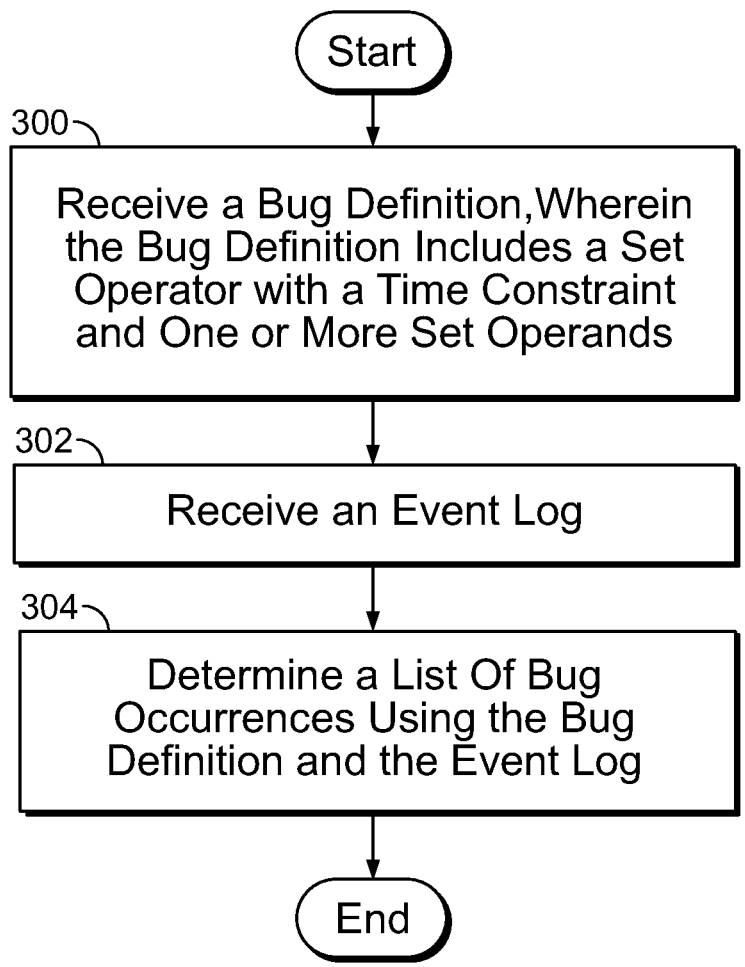
FIG. 3 is a flow diagram illustrating an embodiment of a process for discovering bugs.

FIG. 3 is a flow diagram illustrating an embodiment of a process for discovering bugs. In some embodiments, the process for discovering bugs is executed by a system for discovering bugs (e.g., system for discovering bugs 200 of FIG. 2). In the example shown, in 300 a bug definition is received, wherein the bug definition includes a set operator with a time constraint and one or more set operands. In 302, an event log is received. In 304, a list of bug occurrences is determined using the bug definition and the event log.

A methodology of discovering bugs via an interval algebra based bug query language is disclosed. The most relevant operations on discrete events for bug discovery are identified and augmented with semantics in time constraints. The composability of those operations allows a bug query language that enables simple to arbitrary and complex expressions to capture numerous bug patterns.

An interval is a space between two objects, points, or units. A time interval is the temporal interval period between two moments on a timeline. We use two kinds of time interval: (1) Time interval between two events, and (2) Time interval of a single event's start point and end point. The time interval between two events is the foundation upon which interval algebra operators are built. The time interval of an event's start point and end point is the input and output of interval algebra operators.

FIG. 4 is a table illustrating an embodiment of operators. In the example shown, thirteen basic interval algebra operators are defined: BEFORE, AFTER, EQUALS, MEETS, OVERLAPS, DURING, STARTS, FINISHES, AND, OR, XOR, NOT and TIMES. The table shows 4 columns the operation name, the operation symbol, an example of usage, and a description. In this table, X and Y are two kinds of events, where x and y are each a single event of set X and set Y. In these thirteen operations, EQUALS, MEETS, OVERLAPS, STARTS, FINISHES, AND, OR and XOR are commutative operations. They get the same result in the case that left operand and right operand are switched. BEFORE, AFTER, EQUALS, STARTS, FINISHES, AND, OR and XOR are associative operations.

Inputs of interval algebra operators are events with a time interval (start point and end point). Outputs of these operators are new events with a time interval. For example, the operator "MEETS" means the end-point of X meets the start-point of Y or end-point of Y meets the start-point of X. The new time interval of the output event is calculated. Usually they are equal to [min(startof(X), startof(Y), max (endof(X), endof(Y))]. "min" means the smaller (or equally small) one of inputs. "max" means the bigger (or equally big) one of input. "startof" means start point of event. "endof" means end point of event.

FIG. 5 is a table illustrating an embodiment of operators. In the example shown, to discover bugs, basic interval algebra operators are not sufficient in practice. For example, if we want to find a bug where event X occurs after event Y with a time distance of less than one hour, the basic AFTER operator is insufficient. To overcome this limitation, There are time constraints on eight operators: BEFORE, AFTER, OVERLAPS, STARTS, FINISHES, AND, XOR and TIMES. Time constraints are not applicable to the other four operators, EQUAL, MEETS, DURING and OR. FIG. 5 shows how time constraints are used with interval algebra operators.

The expression of the bug query language is called a "bug query expression". It is composed of events, interval algebra operators, and time constraints. A bug query expression can be used to express bug patterns that are indicated by events with time interval information. Interval algebra based bug query language has two important features: (1) Output of an expression can be an input of another expression. Output of a bug query expression is a new set of events. Therefore, they can be used as an operand in its enclosing expression. This feature ensures bug query expression is composable. (2) The criterion of judging bugs is whether the result set is empty. A monitored system is deemed to have the corresponding bugs if the evaluation result of the expression is not empty. Otherwise, it is free of that bug.

There are 3 steps to scan a bug.

1. Define a bug query expression for a given bug. For example: "(X<[≤1 h] Y) D Z" means it has a bug if the following two conditions are satisfied: (1) Event X occurs no more than 1 hour ahead of event Y. (2) Time periods of both X and Y that matched the first condition are in Z's time period.

2. Receive an events list

3. Find events that match bug query expression. Any found indicates bug discovered.

In practice, bug scan operations are evaluated within a specific time period since you may get different results depending on the "evaluation space". For example, if you search for bugs with 3 days' (the evaluation space) event logs, you may get different results than if you search for bugs using event logs for 5 years.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for discovering bugs, comprising:
a memory coupled to a processor, and configured to provide the processor with instructions for execution of:
an input interface configured to receive an event log, wherein the event log comprises a text file of software status messages;
the processor further configured to:
parse the event log to build an event symptom database, wherein the event symptom database comprises a structured database of software status messages;
evaluate a bug definition on the event symptom database by executing a composable bug query expression that includes at least one of an event, an interval algebra operator, or a time constraint to express bug patterns that are indicated by one or more events with time interval information, and to determine whether a bug as defined by the bug definition has occurred, wherein the bug definition comprises a set of rules for identifying bugs, wherein a rule for identifying bugs comprises an event symptom condition; and
provide a list of bug occurrences.

2. The system of claim 1, wherein the event symptom database stores a symptom type.

3. The system of claim 1, wherein the event symptom database stores a symptom status.

4. The system of claim 1, wherein the event symptom database stores a symptom variable.

5. The system of claim 1, wherein the event symptom database stores a symptom time.

6. The system of claim 1, wherein the bug definition comprises a set operator.

7. The system of claim 6, wherein the set operator comprises one or more of the following: overlaps, during, starts, finishes, and, or, xor, not, or times.

8. The system of claim 6, wherein the set operator includes a time constraint.

9. The system of claim 8, wherein the time constraint includes a time constraint relation.

10. The system of claim 9, wherein the time constraint relation comprises one of the following: less than, less than or equal to, greater than, greater than or equal to, or equal to.

11. The system of claim 8, wherein the time constraint includes a time constraint value.

12. A method for discovering bugs, comprising:
receiving an event log, wherein the event log comprises a text file of software status messages;
parsing, using a processor, the event log to build an event symptom database, wherein the event symptom database comprises a structured database of software status messages;
evaluating a bug definition on the event symptom database including executing a composable bug query expression that includes at least one of an event, an interval algebra operator, or a time constraint to express bug patterns that are indicated by one or more events with time interval information, and to determine whether a bug as defined by the bug definition has occurred, wherein the bug definition comprises a set of rules for identifying bugs, wherein a rule for identifying bugs comprises an event symptom condition; and
providing a list of bug occurrences.

13. A computer program product for discovering bugs, the computer program product being embodied in a tangible non-transitory computer readable storage medium and comprising computer instructions for:
receiving an event log, wherein the event log comprises a text file of software status messages;
parsing, using a processor, the event log to build an event symptom database, wherein the event symptom database comprises a structured database of software status messages;
evaluating a bug definition on the event symptom database including executing a composable bug query expression that includes at least one of an event, an interval algebra operator, or a time constraint to express bug patterns that are indicated by one or more events with time interval information, and to determine whether a bug as defined by the bug definition has occurred, wherein the bug definition comprises a set of rules for identifying bugs, wherein a rule for identifying bugs comprises an event symptom condition; and
providing a list of bug occurrences.

* * * * *